C. N. DE WITT.
FRACTIONAL DIVIDERS.
APPLICATION FILED OCT. 12, 1917.
1,299,307.
Patented Apr. 1, 1919.
3 SHEETS—SHEET 2.
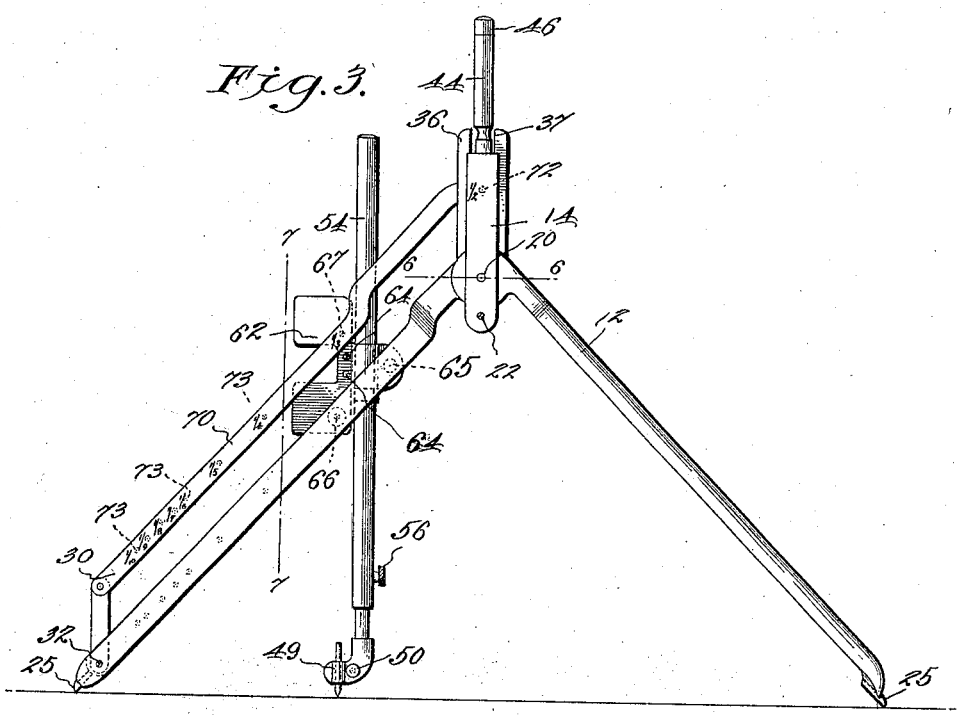
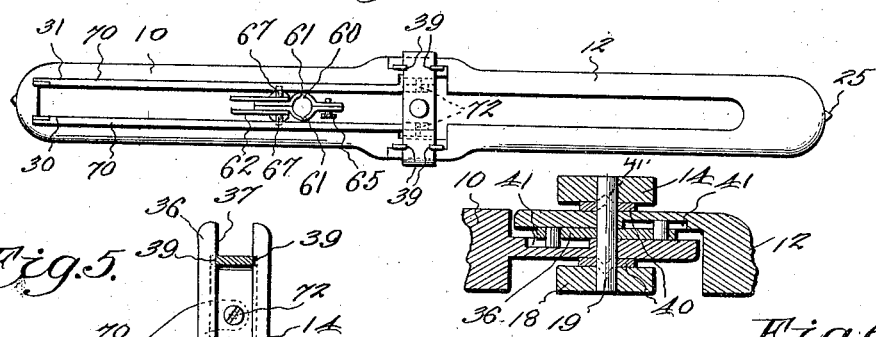
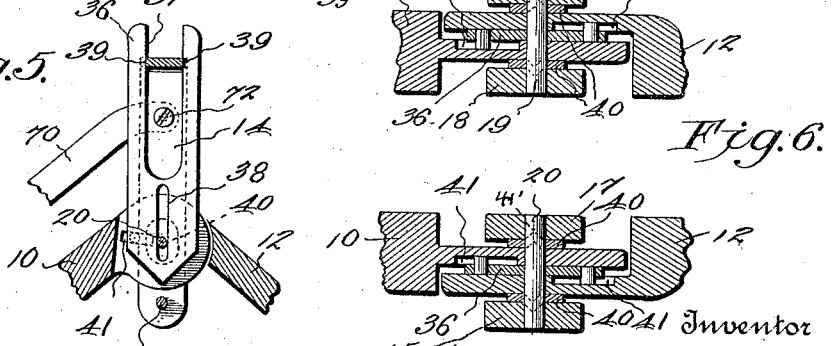
Inventor
Clarence N. De Witt,
Witnesses
W. Mart. Duvall
E. M. Springer
By Victor J. Evans
Attorney

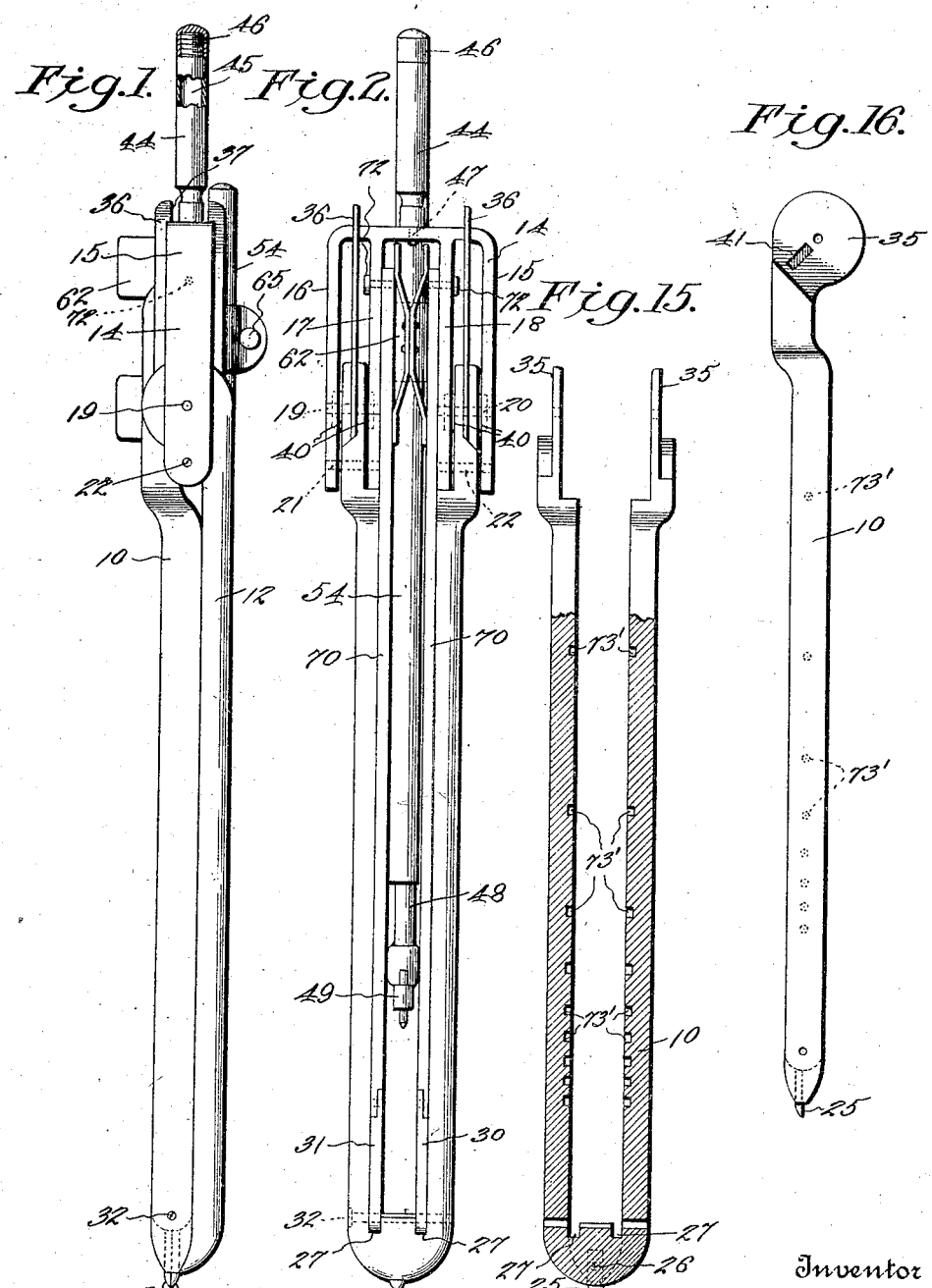

C. N. DE WITT.
FRACTIONAL DIVIDERS.
APPLICATION FILED OCT. 12, 1917.

1,299,307.

Patented Apr. 1, 1919.
3 SHEETS—SHEET 3.

Witnesses
M. May. Duvall
E. M. Springer

Inventor
Clarence N. DeWitt,
By Victor J. Evans
Attorney

UNITED STATES PATENT OFFICE.

CLARENCE N. DE WITT, OF KIMBERLY, IDAHO.

FRACTIONAL DIVIDERS.

1,299,307. Specification of Letters Patent. Patented Apr. 1, 1919.

Application filed October 12, 1917. Serial No. 196,266.

*To all whom it may concern:*

Be it known that I, CLARENCE N. DE WITT, a citizen of the United States, residing at Kimberly, in the county of Twin Falls and State of Idaho, have invented new and useful Improvements in Fractional Dividers, of which the following is a specification.

This invention relates to a fractional divider, and one object is to provide an instrument which may be used as an ordinary divider, and which by adding a third leg in the form of a dividing pencil, may be used for dividing any line, within a given limit, into fractional parts.

A further object is to provide in connection with an instrument of the type specified, a fractional rule by the use of which the third leg or pencil may be placed in the correct position for dividing any line within the aforesaid limit into fractions, such as thirds, fifths, eighths, etc.

A further object is to provide certain novel means for mounting the pencil employed in the instrument specified.

A still further object is to provide certain novel mounting means for the leg members, and guiding means for maintaining the elements in correct position with reference to the surface on which the divider is used.

With the foregoing and other objects in view, the invention consists in the novel construction, combination and arrangement of elements hereinafter described and claimed.

In the accompanying drawings:

Figures 1 and 2 are views in side elevation.

Fig. 3 is a view in side elevation, the legs being in open position.

Fig. 4 is a top plan view with the legs in the position shown in Fig. 3.

Fig. 5 is a detail showing a portion of the pivotal mounting.

Fig. 6 is a section on line 6—6 of Fig. 3.

Figs. 15 and 16 are views, respectively, in section and in elevation of one of the legs.

Figure 7:
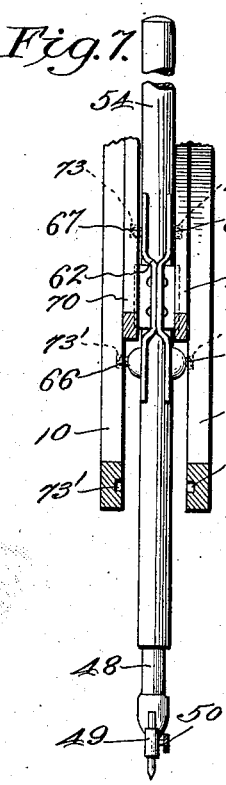
Fig. 7 is a section on the line 7—7 of Fig. 3.
Figure 8:
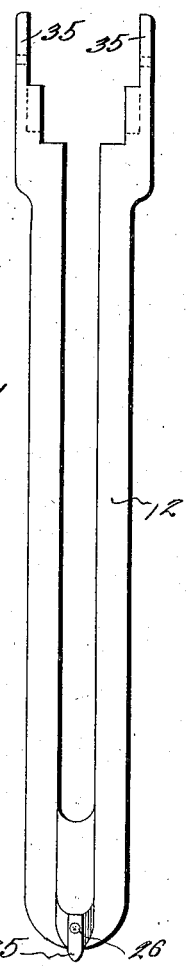
Fig. 8 is a view of one of the legs from the inner side.
Figures 9, 10:
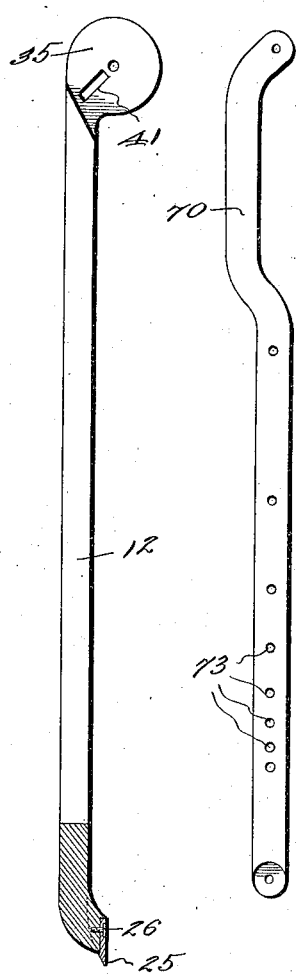
Fig. 9 is a longitudinal section of one of the leg members.
Fig. 10 shows one member of the fraction rule.
Figure 11:
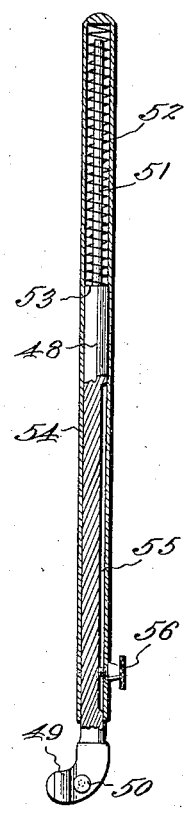
Fig. 11 is a longitudinal section of the leg carrying the pencil.
Figure 12:
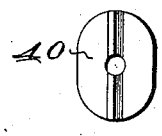
Figs. 12 and 13 are detail views of the guiding device.
Figure 13:
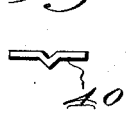
Figure 14:
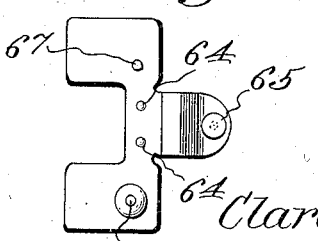
Fig. 14 is a detail of a clip holding the leg carrying the pencil.

The instrument includes a plurality of legs the larger of which is designated 10 and the smaller is shown at 12. These legs are pivotally mounted in a device of novel construction and including a frame 14, U-shaped in general configuration, and including outer members 15 and 16 and inner members or prongs 17 and 18 spaced at equal distances from members 15 and 16 and extending parallelly with reference thereto.

The legs 10 and 12 are mounted within frame 14 and have a swinging movement on pivots 19 and 20, the ends of the prongs being connected by screws 21 and 22.

The leg members each comprise a plurality of parallel portions connected at the lower ends, these ends carrying steel points 25 secured by means of screws 26. The end portion of the larger leg is provided with recesses 27 in which are mounted certain elements of the fraction guide described below, these elements being designated 30 and 31 and secured by means of a threaded pin or screw 32.

Each leg is provided with an offset cutaway portion 35 at the end through which the pivotal members or legs are designed to pass. Between the portions 35 of the respective legs are mounted guiding devices comprising slotted plates 36 formed with a main slot 37 open at one end with a shorter slot 38 closed at both ends. The pivotal members pass through the slots 38, and the slots 37 accommodate the restricted upper portions of the frame 14 and provide for guiding the elements in order that the frame may maintain a vertical position with reference to the surface on which the instrument is used. The restricted portions mentioned are provided by cutting away the upper member of the frame as shown at 39. Between the respective portions 35 of the legs and the vertical members of the frame additional guiding devices 40 are mounted, four of these devices being employed whereas only two of the guiding members 36 are required. These guiding devices 40 each include an offset portion coöperating with recesses 41′ oppositely located.

A stem 44 is formed with an inner chamber 45 for the accommodation of extra steel points and leads, this stem having a cap 46 for closing the end thereof, and being provided with a threaded extension 47 engaging frame member 14.

The pencil holder includes a main stem for mounting the leads, this stem being designated 48 and carrying at its lower end a clamping member 49 between which the leads are held by means of a clamping screw 50. The stem 48 is provided with a reduced shank portion 51 accommodating a spring 52 bearing against the shoulder 53 of the stem and the closed end of the casing or tubular member 54. The stem 48 is provided with a longitudinal slot 55 engaged by the end of a screw 56 threaded into the casing. The casing is provided with longitudinal ribs 60 cooperating with grooves 61 formed in a spring clip or clasp designated 62 and comprising a plurality of plates of spring steel riveted together as shown at 64 and retained at their free ends by means of a screw 65. The side members of the pencil clasp 62 are provided with a plurality of outwardly extending pins 66 designed to engage apertures formed within the inner sides of the larger leg 10, and a plurality of pins 67 engaging apertures formed in the inner sides of the fraction rule described below. In view of the mounting of the pencil, the latter may be removed and the divider used as an ordinary instrument of the type named.

The fraction rule includes a plurality of parallel members 70 pivoted at 71 and also pivoted at 72 to the link members 30 previously referred to, these members 30 having connection with the lower end of the larger leg by means of pins 32. Each member 70 of the rule is provided with a series of apertures 73 on the inner side thereof and on the outer side with designations such as 1/2, 1/3, 1/4, 1/5, 1/6, 1/7, 1/8, 1/9, 1/10. The particular instrument described is designed to divide any line of ten inches or less into fractions such as those indicated. The spring clasp holding the pencil is mounted between the side members 70 of the fraction rule, and between the side members of the larger leg, the latter being provided with recesses 73' for the accommodation of certain pins previously described and extending from the side members of the clasp.

What is claimed is:

1. A divider comprising a pair of legs pivotally connected, a third leg maintaining a vertical position within the limit of movement of the legs first named, and a fraction guide graduated for setting the third leg at the required point for dividing proportionally the distance between the legs first named when in any adjusted position within the aforesaid limit, and mounting means for effecting pivotal connection of the third leg with one of the other legs and with the fraction guide.

2. A divider comprising a pair of legs having bifurcated ends, a U-shaped frame comprising a plurality of parallel members and a transverse connecting element, the legs being pivotally mounted between the parallel members, said legs being provided with offset portions spaced apart, guiding members mounted between the spaced portions, and comprising slotted elements adapted to engage and be guided by the transverse element of the U frame.

3. A divider comprising a pair of pivoted legs, and means for dividing proportionally the distance between the legs, when extended to any degree within the limit of movement thereof, said means including a member mounted parallelly with reference to one of the legs and movable longitudinally with reference thereto, and a pencil holding device, and means for pivotally connecting the latter with the parallel member and the adjacent leg.

4. A divider comprising a pair of pivoted legs, a bar arranged along side of one leg and pivotally connected thereto and maintaining parallel relation therewith, said bar being provided with designations indicating fractions of the distances between the free ends of the legs first named, and a third leg and mounting means therefor for engaging the bar and the adjacent leg at a point corresponding with each designation.

5. A divider comprising a pair of pivoted legs, a third leg mounted to indicate fractional portions of the distances between the legs first named within the limit of movement of said legs first named, the third leg comprising a tubular member, a spring held stem therein, and a lead holding device carried by the stem, means for pivotally connecting the third leg with one of the other legs, and means causing the third leg to maintain a position parallel with the axis of the instrument.

In testimony whereof I affix my signature.

CLARENCE N. DE WITT.